(12) United States Patent
Pani (10) Patent No.: US 9,634,846 B2
(45) Date of Patent: Apr. 25, 2017

(54) RUNNING LINK STATE ROUTING PROTOCOL IN CLOS NETWORKS

(71) Applicant: Cisco Technology, Inc., San Jose, CA (US)

(72) Inventor: Ayaskant Pani, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/445,769

(22) Filed: Jul. 29, 2014

(65) Prior Publication Data

US 2015/0124642 A1 May 7, 2015

Related U.S. Application Data

(60) Provisional application No. 61/900,359, filed on Nov. 5, 2013.

(51) Int. Cl.
*H04L 12/28* (2006.01)
*H04L 12/18* (2006.01)
(Continued)

(52) U.S. Cl.
CPC .......... *H04L 12/18* (2013.01); *H04L 12/4633* (2013.01); *H04L 41/082* (2013.01); *H04L 41/12* (2013.01); *H04L 41/22* (2013.01); *H04L 43/0811* (2013.01); *H04L 43/50* (2013.01); *H04L 45/02* (2013.01); *H04L 45/20* (2013.01); *H04L 45/64* (2013.01); *H04L 49/201* (2013.01); *H04L 49/25* (2013.01); *H04L 61/2007* (2013.01); *H04L 61/2061* (2013.01); *H04L 61/6004* (2013.01); *H04L 69/22* (2013.01); *H04L 61/103* (2013.01)

(58) Field of Classification Search
CPC .... H04L 12/18; H04L 12/4633; H04L 5/0094
See application file for complete search history.

(56) References Cited

U.S. PATENT DOCUMENTS 6,456,624 B1  9/2002 Eccles et al.
7,152,117 B1  12/2006 Stapp et al.
(Continued)

FOREIGN PATENT DOCUMENTS

WO  WO 2014071996  5/2014

OTHER PUBLICATIONS

Whitaker, Andrew, et al., "Forwarding Without Loops in Icarus," IEEE Openarch 2002, pp. 63-75.

*Primary Examiner* — Chirag Shah
*Assistant Examiner* — Jael Ulysse
(74) *Attorney, Agent, or Firm* — Polsinelli PC (57) ABSTRACT

Systems, methods and transitory computer-readable storage media for running a link state routing protocol in a network that includes spine and leaf nodes. The methods include, receiving at a node in a network, one or more LSPs and re-forwarding the LSPs to other nodes. A spine node generates copies of the received LSPs and forwards the copies of the LSP to the leaf nodes in the network at a rate that is faster than the rate that the leaf nodes re-route the LSPs to the spine nodes using a hardware flooding mechanism in order to reduce the amount of processing that occurs at each spine node. In order to synchronize the LSP databases, the spine nodes send triggered CSNPs, using hardware flooding, to all leaf nodes in the network.

13 Claims, 3 Drawing Sheets

(51) Int. Cl.

| | | |
|---|---|---|
| *H04L 12/26* | (2006.01) | |
| *H04L 12/733* | (2013.01) | |
| *H04L 12/24* | (2006.01) | |
| *H04L 12/751* | (2013.01) | |
| *H04L 12/947* | (2013.01) | |
| *H04L 12/931* | (2013.01) | |
| *H04L 12/715* | (2013.01) | |
| *H04L 29/12* | (2006.01) | |
| *H04L 29/06* | (2006.01) | |
| *H04L 12/46* | (2006.01) | |

(56) References Cited

U.S. PATENT DOCUMENTS

| | | | |
|---|---|---|---|
| 7,177,946 | B1 | 2/2007 | Kaluve et al. |
| 7,826,400 | B2 | 11/2010 | Sakauchi |
| 7,848,340 | B2 | 12/2010 | Sakauchi et al. |
| 8,339,973 | B1 | 12/2012 | Pichumani et al. |
| 8,868,766 | B1 | 10/2014 | Theimer et al. |
| 9,258,195 | B1 | 2/2016 | Pendleton et al. |
| 9,374,294 | B1 | 6/2016 | Pani |
| 9,444,634 | B2 | 9/2016 | Pani et al. |
| 2003/0067912 | A1 | 4/2003 | Mead et al. |
| 2003/0115319 | A1 | 6/2003 | Dawson et al. |
| 2004/0103310 | A1 | 5/2004 | Sobel et al. |
| 2004/0160956 | A1 | 8/2004 | Hardy et al. |
| 2004/0249960 | A1 | 12/2004 | Hardy et al. |
| 2005/0010685 | A1 | 1/2005 | Ramnath et al. |
| 2005/0013280 | A1 | 1/2005 | Buddhikot et al. |
| 2005/0083835 | A1 | 4/2005 | Prairie et al. |
| 2005/0117593 | A1* | 6/2005 | Shand .............. H04L 45/02 370/401 |
| 2005/0175020 | A1 | 8/2005 | Park et al. |
| 2005/0207410 | A1 | 9/2005 | Adhikari et al. |
| 2006/0013143 | A1 | 1/2006 | Yasuie et al. |
| 2006/0039364 | A1* | 2/2006 | Wright .............. H04L 41/0893 370/352 |
| 2006/0072461 | A1* | 4/2006 | Luong .............. H04L 45/02 370/236 |
| 2006/0193332 | A1* | 8/2006 | Qian .............. H04L 12/18 370/397 |
| 2006/0209688 | A1 | 9/2006 | Tsuge et al. |
| 2006/0221950 | A1 | 10/2006 | Heer |
| 2006/0227790 | A1* | 10/2006 | Yeung .............. H04L 45/00 370/395.31 |
| 2006/0268742 | A1 | 11/2006 | Chu et al. |
| 2006/0274647 | A1 | 12/2006 | Wang et al. |
| 2006/0280179 | A1 | 12/2006 | Meier |
| 2007/0025241 | A1 | 2/2007 | Nadeau et al. |
| 2007/0047463 | A1* | 3/2007 | Jarvis .............. H04L 45/02 370/254 |
| 2007/0165515 | A1* | 7/2007 | Vasseur .............. H04L 12/66 370/216 |
| 2007/0171814 | A1 | 7/2007 | Florit et al. |
| 2007/0177525 | A1* | 8/2007 | Wijnands .............. H04L 12/18 370/254 |
| 2007/0183337 | A1 | 8/2007 | Cashman et al. |
| 2007/0217415 | A1* | 9/2007 | Wijnands .............. H04L 12/1836 370/390 |
| 2008/0031130 | A1 | 2/2008 | Raj et al. |
| 2008/0092213 | A1 | 4/2008 | Wei et al. |
| 2008/0212496 | A1* | 9/2008 | Zou .............. H04L 45/00 370/255 |
| 2009/0067322 | A1* | 3/2009 | Shand .............. H04L 45/00 370/225 |
| 2009/0094357 | A1 | 4/2009 | Keohane et al. |
| 2009/0161567 | A1 | 6/2009 | Jayawardena et al. |
| 2009/0193103 | A1 | 7/2009 | Small et al. |
| 2009/0232011 | A1 | 9/2009 | Li et al. |
| 2009/0238196 | A1 | 9/2009 | Ukita et al. |
| 2010/0020719 | A1* | 1/2010 | Chu .............. H04L 41/12 370/254 |
| 2010/0020726 | A1* | 1/2010 | Chu .............. H04L 12/462 370/256 |
| 2010/0191813 | A1 | 7/2010 | Gandhewar et al. |
| 2010/0191839 | A1 | 7/2010 | Gandhewar et al. |
| 2010/0223655 | A1 | 9/2010 | Zheng |
| 2010/0312875 | A1 | 12/2010 | Wilerson et al. |
| 2011/0022725 | A1* | 1/2011 | Farkas .............. H04L 45/00 709/238 |
| 2011/0110241 | A1 | 5/2011 | Atkinson et al. |
| 2011/0138310 | A1 | 6/2011 | Gomez et al. |
| 2011/0170426 | A1 | 7/2011 | Kompella et al. |
| 2011/0199891 | A1* | 8/2011 | Chen .............. H04L 45/22 370/218 |
| 2011/0199941 | A1* | 8/2011 | Ouellette .............. H04L 12/1836 370/256 |
| 2011/0243136 | A1 | 10/2011 | Raman et al. |
| 2011/0280572 | A1 | 11/2011 | Vobbilisetty et al. |
| 2011/0286447 | A1 | 11/2011 | Liu et al. |
| 2011/0299406 | A1 | 12/2011 | Vobbilisetty et al. |
| 2011/0321031 | A1 | 12/2011 | Dournov et al. |
| 2012/0030150 | A1* | 2/2012 | McAuley .............. H04L 45/02 706/12 |
| 2012/0057505 | A1* | 3/2012 | Xue .............. H04L 12/5695 370/255 |
| 2012/0102114 | A1 | 4/2012 | Dunn et al. |
| 2012/0300669 | A1* | 11/2012 | Zahavi .............. H04L 45/124 370/254 |
| 2013/0055155 | A1 | 2/2013 | Wong et al. |
| 2013/0097335 | A1 | 4/2013 | Jiang et al. |
| 2013/0182712 | A1 | 7/2013 | Aguayo et al. |
| 2013/0208624 | A1* | 8/2013 | Ashwood-Smith ..... H04L 45/50 370/255 |
| 2013/0223276 | A1* | 8/2013 | Padgett .............. H04L 45/02 370/254 |
| 2013/0227689 | A1 | 8/2013 | Pietrowicz et al. |
| 2013/0250779 | A1 | 9/2013 | Meloche et al. |
| 2013/0250951 | A1 | 9/2013 | Koganti |
| 2013/0276129 | A1 | 10/2013 | Nelson et al. |
| 2013/0311663 | A1 | 11/2013 | Kamath et al. |
| 2013/0311991 | A1 | 11/2013 | Li et al. |
| 2013/0322258 | A1 | 12/2013 | Nedeltchev et al. |
| 2013/0322446 | A1 | 12/2013 | Biswas et al. |
| 2013/0329605 | A1* | 12/2013 | Nakil .............. H04L 41/0668 370/255 |
| 2013/0332399 | A1 | 12/2013 | Reddy et al. |
| 2013/0332577 | A1 | 12/2013 | Nakil et al. |
| 2013/0332602 | A1 | 12/2013 | Nakil et al. |
| 2014/0016501 | A1 | 1/2014 | Kamath et al. |
| 2014/0086097 | A1* | 3/2014 | Qu .............. H04L 45/026 370/254 |
| 2014/0146817 | A1 | 5/2014 | Zhang |
| 2014/0149819 | A1* | 5/2014 | Lu .............. H04L 45/021 714/748 |
| 2014/0201375 | A1 | 7/2014 | Beereddy et al. |
| 2014/0219275 | A1 | 8/2014 | Allan et al. |
| 2014/0269712 | A1 | 9/2014 | Kidambi |
| 2015/0016277 | A1 | 1/2015 | Smith et al. |
| 2015/0092593 | A1 | 4/2015 | Kompella |
| 2015/0113143 | A1 | 4/2015 | Stuart et al. |
| 2015/0124586 | A1 | 5/2015 | Pani |
| 2015/0124587 | A1 | 5/2015 | Pani |
| 2015/0124629 | A1 | 5/2015 | Pani |
| 2015/0124644 | A1 | 5/2015 | Pani |
| 2015/0124654 | A1 | 5/2015 | Pani |
| 2015/0124823 | A1 | 5/2015 | Pani et al. |
| 2015/0127701 | A1 | 5/2015 | Chu et al. |
| 2015/0188771 | A1 | 7/2015 | Allan et al. |
| 2015/0378712 | A1 | 12/2015 | Cameron et al. |
| 2015/0378969 | A1 | 12/2015 | Powell et al. |
| 2016/0119204 | A1 | 4/2016 | Murasato et al. |

* cited by examiner

RUNNING LINK STATE ROUTING PROTOCOL IN CLOS NETWORKS

CROSS-REFERENCES TO RELATED APPLICATIONS

This application claims priority to U.S. Provisional Patent Application No. 61/900,359, entitled "A Scalable Way to do Aging of a Very Large Number of Entities" filed on Nov. 5, 2013, which is hereby incorporated by reference herein in its entirety.

TECHNICAL FIELD

The present technology pertains to computer networks and more specifically pertains to the scaling of traditional routing protocols in dense CLOS networks.

BACKGROUND

Running traditional routing protocols in a dense topology (e.g. CLOS) with a large number of switches interconnected in a bipartite manner does not scale adequately. For example, if we consider a 2-level folded-CLOS topology with a level-1 PoD consisting of ten (10) spines and five hundred (500) fabric edge switches (ToRs) and then each level-1 pod interconnected in a fully bipartite manner to ten (10) level-2 spines, a traditional interior gateway protocol ("IGP") will not scale and convergence will be poor in cases of network failures. In another example of this difficulty, consider a single layer PoD with 10 level-1 spines and 500 ToRs, where each ToR is connected to each spine. A spine failure occurs at this point. Each of the 500 ToRs will notice that a link which was previously up has gone down. This will initiate a Link State Packet (LSP) to indicate this transition in topology. Each of the surviving spines will receive these LSPs from each ToR. Thus, each of 9 spines receives 500 LSPs. These LSPs are then forwarded to the ToRs. Each ToR will in turn forward the LSP it receives from one spine to all the other 8 spines from which it might not have received the latest copy of the LSP. Depending on spine load and other factors such as how fast the other spine is or how long the LSP queue is, one spine might receive (500*500) or 250,000 LSPs. This puts a tremendous burden upon the capability of each spine node.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

In one aspect of the present disclosure, a method is disclosed, where the method includes receiving, at a particular spine node in a network, one or more LSPs. The network includes a plurality of leaf nodes in communication with a plurality of spine nodes, and the LSPs are generated by one or more of the plurality of leaf nodes upon detection of a network topology change in the network. The particular spine node generates copies of the received LSPs, and forwards the copies of the received LSPs to the at least one of the plurality of leaf nodes at a rate that is faster than a rate that the plurality of leaf nodes re-route the copies of the LSPs to each of the plurality of spine nodes.

In another aspect of the present disclosure, a system is provided, where the system includes a processor, and a computer-readable storage medium having stored therein instructions which, when executed by the processor, cause the processor to perform a series of operations. These operations include, receiving one or more LSPs, the LSPs generated by one or more of the plurality of leaf nodes upon detection of a network topology change in the network, the network comprising a plurality of leaf nodes in communication with a plurality of spine nodes, generating copies of the received LSPs, and forwarding the copies of the received LSPs to the at least one of a plurality of leaf nodes at a rate that is faster than a rate that the plurality of leaf nodes re-route the copies of the LSPs to the plurality of spine nodes.

Yet another aspect of the present disclosure provides a non-transitory computer-readable storage medium having stored therein instructions which, when executed by a processor, cause the processor to perform a series of operations. These operations include, upon detection of a spine node failure in a network, the network comprising a plurality of leaf nodes in communication with a plurality of spine nodes, sending, by a particular leaf node of the plurality of leaf nodes, an LSP to each surviving spine node of the plurality of spine nodes, receiving from each surviving spine node, copies of LSPs sent to each surviving spine node by other leaf nodes of the plurality of leaf nodes in the network, and delaying re-forwarding of the copies of the LSPs to the surviving spine nodes.

DETAILED DESCRIPTION

The present disclosure describes systems, methods, and non-transitory computer-readable storage media for running a link state routing protocol in dense CLOS networks. In a dense network that includes many fabric edge switches (e.g. "leaf nodes" or "ToRs") connected to multiple spine nodes, during network transition, e.g., when a spine node fails or when one or more links transition their operation state (up or down, or vice-versa), each ToR generates a link state packet (LSP) indicating a link failure and forwards the LSP to each surviving spine node. Each surviving spine node applies LSP admission procedures and assures that the received LSP is not a duplicate or a stale LSP. Each surviving spine node then hardware floods a copy of each LSP it receives to each other ToR in the network. Advantageously, rather than simply forward a copy of each received LSP to each surviving spine node in the network, each ToR delays its forwarding by a specified amount of time. This increases the likelihood that each ToR will receive copies of the latest LSPs from each of the surviving nodes before each ToR re-forwards a copy of the LSPs to other surviving spine nodes, which would overburden the spine nodes. In this fashion, the amount of work needed to process incoming LSPs at each surviving spine node is significantly reduced.

Figure 1:
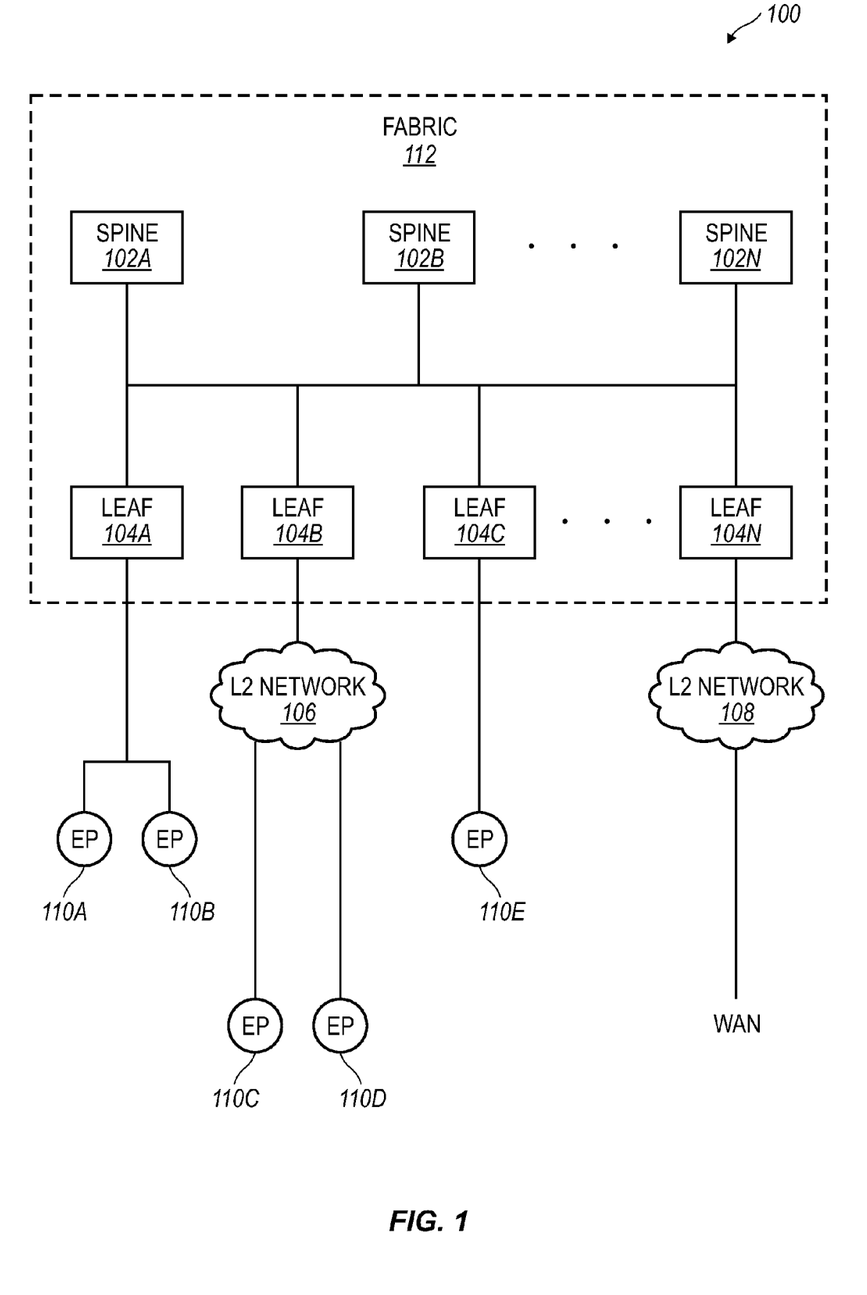
FIG. 1 illustrates a schematic block diagram of an example architecture for a network fabric that incorporates principles of the present technology.

FIG. 1 illustrates a schematic block diagram of an example architecture 100 for a network fabric 112. The network fabric 112 can include spine switches 102A, 102B, . . . , 102N (collectively "102") connected to leaf switches (also referred to as ToRs) 104A, 104B, 104C, . . . , 104N (collectively "104") in network fabric 112. Spine switches 102 can be L3 switches in fabric 112. However, in some cases, spine switches 102 can also, or otherwise, perform L2 functionalities. Each leaf node 104 is connected via a link to each spine node 102 connect in fabric 112. Leaf nodes 104 can include access ports (or non-fabric ports) and fabric ports. Fabric ports can provide uplinks to spine switches 102, while access ports can provide connectivity for devices, hosts, endpoints, virtual machines ("VMs"), or external networks to fabric 112.

Leaf nodes 104 can reside at the edge of fabric 112 as illustrated in FIG. 1, and can thus represent the physical network edge. In some cases, leaf nodes 104 can be top-of-rack ("ToR") switches configured according to a ToR architecture. In other cases, leaf nodes 104 can be aggregation switches in any particular topology, such as end-of-row (EoR) or middle-of-row (MoR) topologies. Leaf nodes 104 can also represent aggregation switches, for example.

Network connectivity in fabric 112 can flow through leaf nodes 104. Here, leaf nodes 104 can provide servers, resources, endpoints, external networks, or VMs access to fabric 112, and can connect leaf nodes 104 to each other. In some cases, leaf nodes 104 can connect EPGs to fabric 112 and/or any external networks. Each EPG can connect to fabric 112 via one of the leaf nodes 104, for example.

Endpoints 110A-E (collectively "110") can connect to fabric 112 via leaf nodes 104. For example, endpoints 110A and 110B can connect directly to leaf node 104A, which can connect endpoints 110A and 110B to fabric 112 and/or any other one of leaf nodes 104. Similarly, endpoint 110E can connect directly to leaf node 104C, which can connect endpoint 110E to fabric 112 and/or any other of the leaf nodes 104. On the other hand, endpoints 110C and 110D can connect to leaf node 104B via L2 network 106. Similarly, the wide area network (WAN) can connect to leaf nodes 104C or any other leaf node 104 via L3 network 108.

Endpoints 110 can include any communication device, such as a computer, a server, a switch, a router, etc. Although fabric 112 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Each leaf node 104 is connected to each spine node 102 in fabric 112. During instances of link-state routing protocol updates, one or more leaf nodes 104 can detect the occurrence of network transitions, such as, for example, failure of one or more spine nodes 102. Examples of link-state routing protocol updates can be for example, intermediate system-to-intermediate system ("IS-IS") or other intra-domain link state routing protocol updates such as Open Shortest Path First ("OSPF") updates. The present disclosure is not limited to any particular type of routing update protocols.

When a spine failure is detected or when any link operational state transition is detected, one or more leaf nodes 104 generate updated LSPs, which are sent either without any delay or sent with a minimal delay, to the surviving spine nodes 102 (i.e., the spine nodes 102 that have not failed). For example, if spine 102A fails, leaf node 104A generates and forwards its own LSP, indicating the failure of spine 102A, to all spine nodes 102 in the fabric 112, with the exception of spine 102A, which has failed. Every other leaf node 104 also sends their own LSPs to the surviving spine nodes 102.

When LSPs are received by each spine node 102, each spine node 102 makes a copy of the LSP and proceeds to forward the copies of the LSPs to all leaf nodes 104, with the exception of the leaf node 104 that forwarded the LSP. For example, upon the failure of spine node 102A, spine node 102B receives LSPs from each leaf node 104 in fabric 112. That is, leaf node 104A, 104B, 104C etc., will each forward LSPs to spine node 102B. Each spine node 102 then hardware floods copies of each LSP that it has received, back to each other leaf node 104 in the fabric 112.

Similarly, when spine nodes 102 have to generate their own LSP, for example, because of topology changes or configuration changes noted at a particular spine node 102, they use a hardware flooding mechanism to forward the LSP to all leaf nodes 104. In one example, the mechanism for hardware flooding the LSPs from spine nodes 104 involves injecting a single copy of the LSP to the hardware module, such as, for example a forwarding Application Specific Integrated Circuit (ASIC), and the ASIC doing the replication of the LSP carries control packets to all relevant network ports on which an IS-IS protocol is enabled.

So if an LSP is sent from leaf node 104A to spine node 102B, spine node 102B sends a copy of this LSP to leaf node 104B, leaf node 104C, etc., until each leaf node 104 has received a copy. Since leaf node 104A sent the LSP to spine node 102B, there is no need for spine node 102B to re-forward the same LSP to leaf node 104A since it knows that leaf node 104A already has a version of the most current LSP. This process can occur at each spine node 102 in fabric 112.

Upon receipt of the LSPs from each spine node 102, rather than re-forward each LSP back to each spine node 102, leaf node 104A (and each other leaf node 104) initiates a time delay of a specified amount. This delay provides an opportunity for each spine node 102 to hardware flood copies of all the LSPs that it has received to each leaf node 104 (again, spine node 102 does not need to resend an LSP back to the leaf node 104 that sent the LSP) before each leaf node 104 can start re-forwarding the LSPs towards the spine nodes 102.

Again using leaf node 104A as an example, suppose leaf node 104A receives copies of LSPs from spine node 104B. These LSPs are copies of the LSPs that spine node 102B received from every other leaf node 104 in fabric 112. Rather than simply turn around and re-forward the LSPs to each spine node 102, leaf node 104B initiates a delay. For example, this delay could be on the order of tens of milliseconds. While there may be a delay for the hardware flooding of LSPs performed by each spine node 102, the delay at leaf node 104A is longer than the delay at the spine nodes 102. Therefore, spine node 102B and all the other spine nodes 102 will forward copies of the LSPs they have received to leaf node 104A and all other leaf nodes 104, before each leaf node 104 can re-forward the received LSPs back to any of the spine nodes 102. This significantly reduces the number of LSPs that need to be processed by the spine nodes 102.

As each leaf node 104 receives LSPs from the spine nodes 102, each leaf node 104 marks the sequence number of the latest copy of LSP it has received. Rather than each leaf node 104 re-forwarding the LSPs back to each surviving spine node 102, instead, a given pair of spine nodes 102 and leaf nodes 104 synchronize to assure that each has a copy of the most current (or latest version) LSP in order to have a current view of the network topology. In order to achieve synchronization, each pair of spine nodes 102 and leaf nodes exchange LSP identifiers and the sequence numbers. Each pair of spine/leaf nodes exchange complete sequence number packets (CSNPs) by exchanging the LSP identifiers and sequence number that each leaf node 104 and spine node 102 has witnessed. If there is any discrepancy between each nodes' sequence numbers and LSP identifiers, the node owning the latest LSP (indicated by the higher sequence number) will forward a copy to the other node.

To ensure reliability, any LSPs noticed as missing during the CSNP exchange are requested and can be acknowledged by for example, using partial sequence number packets ("PSNP") exchanges. Thus, for example, rather than leaf node 104A re-forwarding the LSPs to spine node 102B, leaf node 104A and spine node 102B engage in a synchronization process to ensure that each node possess a copy of the latest LSP. Leaf node 104 identifies the sequence numbers of received LSPs. Spine node 102B sends sequence number information to leaf node 104A, which includes the sequence numbers of the received LSPs. By comparing its own sequence numbers with the sequence numbers sent to it by spine node 102B, leaf node 104A is able to determine if there is a correlation or any discrepancy, This process can be repeated for all leaf nodes 104 and spine nodes 102 in fabric 112.

At the occurrence of any discrepancy, an action can be taken. This action will serve to provide each node with a copy of the latest LSP. Thus, if leaf node 104A determines that spine node 102B does not have a copy of the latest LSP, then leaf node 104A can forward a copy to spine node 102B. Conversely, if leaf node 104A determines that it does not have a copy of the latest LSP, it will request a copy from spine node 102B. In this fashion, rather than each leaf node 104 simply re-forwarding each LSP it receives to each surviving spine node 102 (i.e., all remaining spine nodes 102 in fabric 112 other than the failed node), the re-forwarding of LSPs will only occur selectively for those instances where a select spine node 102 does not have a copy of the latest LSP from a specific leaf node 104.

Figure 2:
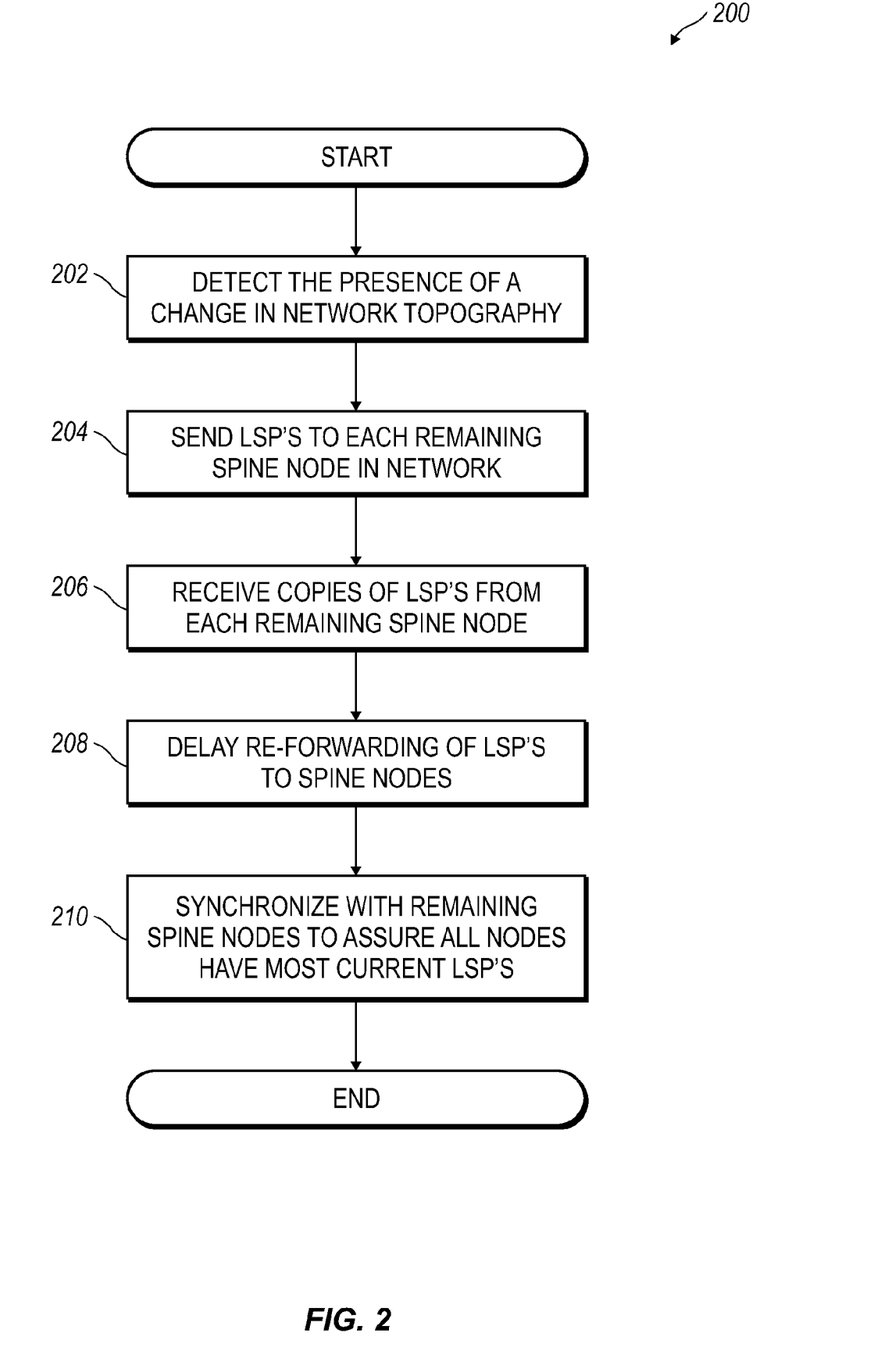
FIG. 2 illustrates an example flowchart illustrating operations performed by one or more leaf nodes incorporating principles of the present technology.

FIG. 2 illustrates an example method utilizing embodiments of the present disclosure. The steps performed in FIG. 2 can be performed by a processor within a leaf node 104 or can be performed by a processor remote from but in communication with leaf node 104. It should be understood that, for any processes discussed herein, such as those depicted in FIG. 2, there can be additional, fewer, or alternative steps, performed in similar or different orders, or in parallel, within the scope of the various embodiments unless otherwise stated. In one example, method 200 may be performed simultaneously or substantially simultaneously by some or all of the leaf nodes 104 in fabric 112.

In a network fabric 112 like the one illustrated in FIG. 1 where nodes are connected in a bi-partite manner, at step 202, a leaf node 104 detects the presence of a change in network topology, for example, the failure of a spine node 102 or any link state transition. As an example, leaf node 104A determines that spine 102A has failed. Leaf node 104A generates LSPs, indicating the failure of spine 102A. At step 204, leaf node 102A forwards LSPs, indicating the spine node failure, over every link in fabric 112 to the surviving spine nodes 102. Thus, each surviving spine node 102 receives LSP updates from leaf node 102A. All other leaf nodes 104 repeat this process. Thus, for example, if there are 500 leaf nodes 104 and 10 spine nodes 102 in fabric 112, and one spine node (e.g., spine node 102A) fails, each of the 500 leaf nodes 104 forwards an LSP to the remaining 9 spine nodes 102.

Each spine node 102 copies the LSPs that it has received, and in turn hardware floods the LSPs to each of the leaf nodes 104. Thus, at step 206, each leaf node 104 receives copies of the LSPs that each spine node 102 received, with the exception of the LSP that leaf node 104 forwarded. As an example, leaf node 104A will receive 499 LSPs from spine node 102B (all of the LSPs received by spine node 102B from leaf nodes 104 with the exception of the LSP received from leaf node 104A), 499 LSPs from spine node 102C, etc. Under traditional methods, leaf node 104A receives copies of all of the other leaf node's LSPs via one spine node (e.g., spine node 102B) over one link before it receives copies of the other leaf node's LSPs via another spine node (e.g., spine node 102C) over a separate link. Then, after having received, for example, the LSPs of the other leaf nodes (from spine node 102B), leaf node 104A will re-forward these LSPs (which originated from each of the other leaf nodes 102) to all the other spine nodes, other than the spine node from which it received the LSP (e.g., spine node 102B). Using this traditional method, each spine node 102 is bombarded with an inordinate amount of LSPs.

Using the methodology of the present disclosure, at step 208, each leaf node 104 initiates a delay of a certain, predetermined amount of time, after having received the LSPs. For example, leaf node 104A receives copies of LSPs from spine node 102B over a particular link. Rather than re-forwarding the LSPs to all of the other surviving spine nodes 102 in fabric 112 via other links, leaf node 104A delays the forwarding of the LSPs and, at step 210, leaf node 104A synchronizes with the spine node that sent it the LSPs (spine node 102B) in order to assure that each node (102B and 104A) maintains within its database the most current LSP, and therefore the most current view of the network. Thus, in one example, the delay initiated by each leaf node 104 results in the surviving spine nodes 102 forwarding copies of all of the LSPs to each leaf node 104 before the leaf nodes 104 can re-forward copies of the LSPs to each of the surviving spine nodes 102.

In one example, the synchronization process of step 210 includes an exchange methodology, e.g., a CSNP exchange, where each node in the process (in this example, spine node 102B and leaf node 104A), identifies sequence number information which includes the sequence number of the LSPs. Thus, spine node 102B identifies the sequence number of the received LSPs from leaf node 104A and leaf node 104A identifies the sequence number of the link upon which it received LSPs from spine node 102B. Each node in the exchange will determine if the sequence number information correlate, thus indicating that each node in the exchange possesses the most current LSP. If this is the case, then there is no need for leaf node 104A to re-flood any further LSPs to spine node 102B, since it knows spine node 102B possesses the most current LSPs. If a discrepancy in the sequence number information is perceived, then the node possessing the most current LSP will forward a copy of this LSP to the other node. This exchange process takes place for each leaf node 104 and each corresponding spine node 102 in fabric 112.

In another example, leaf node 104 can determine the existence of redundant links in fabric 112. This can be done by each leaf node 102 noticing peer system identification information from its neighbor's hello packets and then suppressing the sending of the same LSP on redundant links. If a redundant link is detected, only a single copy of the LSP is sent to the peer over one of the selected links. This detection mechanism can be performed by each neighboring leaf node 104 in order for each leaf node 104 to suppress re-flooding of LSPs to the spine nodes 102 on redundant links.

Figure 3:
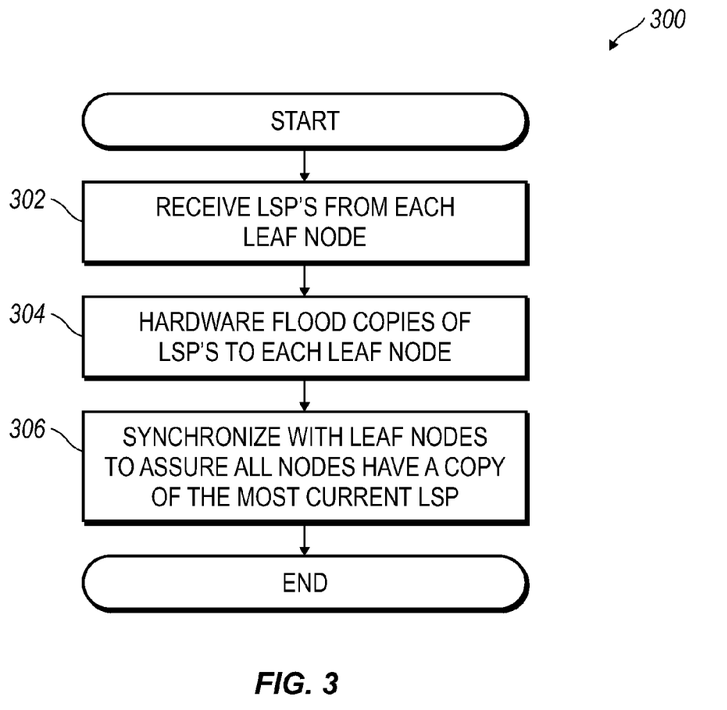
FIG. 3 illustrates an example flowchart illustrating operations performed by one or more spine nodes incorporating principles of the present technology.

FIG. 3 illustrates an example method utilizing embodiments of the present disclosure. The steps performed in FIG. 3 can be performed by a processor within a spine node 104 or can be performed by a processor remote from but in communication with spine node 104. It should be understood that, for any processes discussed herein, such as those depicted in FIG. 3, there can be additional, fewer, or alternative steps, performed in similar or different orders, or in parallel, within the scope of the various embodiments unless otherwise stated. At step 302, each spine node 102 receives LSPs from each leaf node 104 in fabric 112, where the LSPs indicate a change in network topology, for example, one or more spine nodes (e.g., spine node 102A) have failed. At step 304, each spine node 102 then copies the received LSPs and forwards the copies to each of the leaf nodes 104, with the exception of the leaf node 104 from which it received the LSP. Although there may be a delay at each spine node 102 before it floods the LSP copies to the leaf nodes 104, the delay is small enough (e.g., on the order of milliseconds) such that spine nodes 102 will flood the LSPs to the leaf nodes 104 before the leaf nodes 104 can re-flood the LSPs back to the spine nodes 102, due to the longer delay in LSP flooding occurring in each leaf node 104, described above.

Because of the delay at each leaf node 104 upon receiving copies of the LSPs from each spine node 102, spine nodes 102 are not bombarded with LSPs from each leaf node 104. Instead, at step 306, each surviving spine node 102 enters into a synchronization exchange with each leaf node (as described above), in order to assure that each spine node 102 and each leaf node 104 in fabric 112 have a copy of the latest LSP. Thus, spine nodes 102 will only receive a copy of a more current LSP from a leaf node 104 when there is a discrepancy between the LSP identifiers and sequence numbers identified by each node in the exchange, as described above. This selective flooding of LSPs from leaf nodes 104 to spine nodes 102 advantageously reduces the amount of work performed by each spine node 102, which otherwise might have heavily taxed the computational load of one or more spine nodes 102 in fabric 112.

Routing Protocol Implementation

The result of the routing methodology described herein is that the leaf nodes of the network handle more of the combined processing load while the combined work load of the spine nodes is significantly reduced. At both the spine nodes and the leaf nodes, a number of routing protocol changes occurs in order to shift more of the aggregate processing burden from the spine nodes to the leaf nodes, but because there are a larger number of leaf nodes than spine nodes, the per-node processing overhead is normalized across all nodes. All or some of the following routing protocols described below can be implemented by one or more spine nodes or leaf nodes in the network.

When each spine node receives an LSP from one or more leaf nodes, they process and route copies of the LSPs to the other leaf nodes at a rate that is faster than the rate at which the LSP copies are re-routed by the leaf nodes back to the other spine nodes. This can be implemented by each spine node using hardware flooding. Hardware flooding of the LSPs by the spine nodes obviates the need for each spine node to set Send-Routing-Message (SRM) and Subsystem Number (SSN) timers on a per-link basis. Instead, each spine node sets a single global timer set for LSP forwarding. Hardware flooded LSPs can be determined based upon the media access control (MAC) address of the IS-IS packet. This is useful for leaf nodes so that they can suppress sending PSNP (ACK) messages back to the spine nodes upon receipt of LSPs which are hardware flooded. Spine nodes reserve a dedicated source MAC address for hardware flooding of both LSPs and CSNPs (discussed below).

When the leaf nodes receive the hardware flooded LSPs from the spine nodes, the leaf nodes suppress sending of PSNPs to the spine nodes to acknowledge the receipt of the LSPs, which would occur in normal routing protocols. The suppressing of the PSNPs by the leaf nodes advantageously results in reducing processing overhead at the spine nodes which would otherwise occur if each spine node received PSNPs from the leaf nodes, because then each spine node would have to process each of the received PSNPs.

As described above, there is no explicit acknowledgement of receipt of the LSPs when using the hardware flooding mechanism of the present disclosure. To ensure that LSPs are in sync between all switches, the following methodology can be used. When each spine node receives an LSP, it triggers an expedited CSNP timer. The expedited CSNP timer results in the spine nodes sending off CSNP packets to the leaf nodes more frequently than if a normal CSNP timer was used. For example, the expedited CSNP timer of the present technology could be set to 5 seconds rather than 60 seconds. This results in triggered CSNPs being sent to each leaf node than by traditional timing methods. The result is that the synchronization process between spine nodes and leaf nodes can be resolved faster, resulting in less processing at the spine nodes.

If no network topology changes are detected for a designated period of time then LSPs will not be generated. During this dormant period, in order to assure that there is no disparate view of LSP databases among the nodes, the spine nodes can periodically send out CSNPs again using a periodic CSNP timer as opposed to the expedited CSNP timer discussed above. This periodic timer, e.g. 60 seconds, results in hardware flooding of CSNPs at the conclusion of the timer. Thus, while no topology changes in the network are detected, fewer CSNPs are sent out by the spine nodes in order to minimize processor usage at each spine and leaf node, while still ensuring LSP databases are in sync in all nodes.

In addition, timers can be implemented at each leaf node to further insure that less processing occurs at each spine node. For example, LSP re-forwarding and/or CSNP generation at the leaf nodes are done at a slower rate than the re-forwarding of LSPs and/or the generation of CSNPs at the spine nodes. This results in reducing the total number of LSPs and/or CSNPs being received at each spine node to reduce the overall process occurring at the spine nodes. If, as in traditional methods, each leaf node, upon receipt of a CSNP, would generate an acknowledgment, i.e., a PSNP, each spine node would be inundated with PSNPs, each of which would have to be re-routed back to the other leaf nodes in the network. This can be avoided using the procedure described herein.

In certain instances, CSNP/PSNP exchanges can occur. For example, upon receipt of a CSNP, a leaf node or a spine node may determine that their own LSP database is not synchronized with the LSPs identified in the received CSNP. This may occur as follows: The receiving node checks to see if its own LSP database has the latest copies of the LSP that the sending node has identified in its CSNP. In certain instances it may not. Or, the receiving node may have LSPs which are not identified in the received CSNP, thus indicating that the sending node is not aware of the latest LSPs. In either case, one node (either spine or leaf) may specifically acknowledge receipt of the CSNP by forwarding a PSNP in response. This PSNP serves as a request to the other node in the exchange to forward the latest version of the LSPs. The node receiving the latest LSPs can again respond with a PSNP. Because these CSNP/PSNP exchanges occur infrequently, and only as an exception when there is any decrease of LSP hardware flooding within the network, the result is that there is not a significant drain on the processor of the spines participating in these exchanges.

On occasion, rather than hardware flooding CSNPs, the spine nodes, upon detection of a new leaf node entering the network, can arrange to send out CSNPs on a per-link basis. For example, upon detection of a new leaf node entering the network, the spine nodes to which the leaf node is connected, exchange CSNPs with the new leaf node in an expedited manner, using the expedited CSNP timer described above. This CSNP exchange is performed only on the links between the new leaf node and the spine nodes to which the new leaf node is connected. This avoids hardware flooding CSNPs along all other links, again, to reduce overhead. After one or more (e.g., 3 or 4) CSNP exchanges, the new leaf node and the spine nodes to which it is connected can be assured that the new leaf node is in sync with the spine nodes to which it is connected, i.e., that the LSP database of the new leaf node contains the most current version of the LSPs that are in the LSP databases of the spine nodes to which the leaf node is connected. The new leaf node can now rely on hardware flooded CSNPs in the manner described above and the per-link CSNP exchange is suspended.

Yet another way of minimizing spine node processing is the detection of redundant links. For example, during IS-IS adjacency establishment, nodes on each end of a link become aware of the node on the other side of the link. For example, if there are four links between a particular spine node and leaf node, each of these nodes are aware of the multiple links connecting the two nodes. Then, when the leaf node receives an LSP, it can choose to forward the LSP on less than all of the links and suppress forwarding of the LSP on the other links. In this fashion, by using mesh-group configuration, each node in the network is aware of redundant links between itself and another node and can automatically choose to send LSPs along less than all the links (e.g., only one link) connecting the peer nodes and not send LSPs along the other redundant (i.e., the other three) links. This results in fewer LSPs being sent to the spine nodes, therefore reducing the amount of processing being performed by the spine node.

Figure 4:
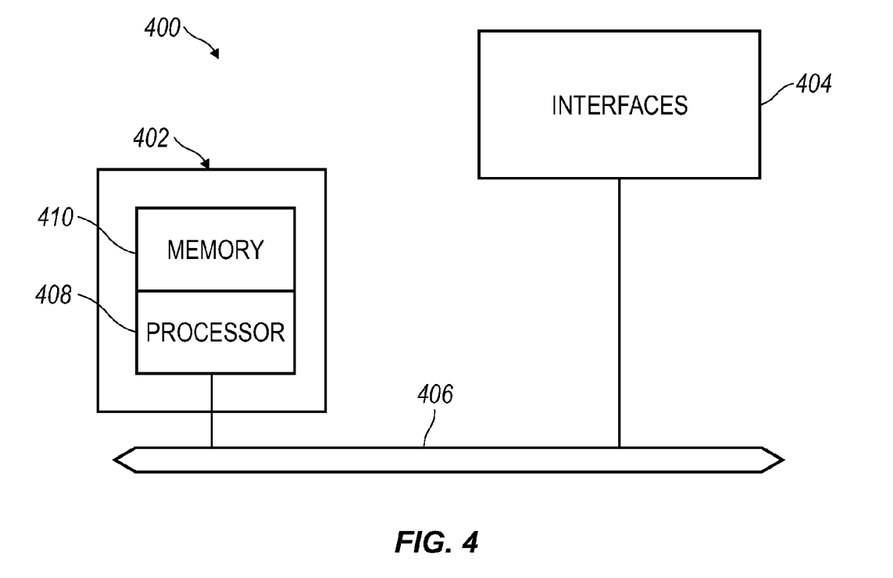
FIG. 4 illustrates an example block diagram of a network node configured according to principles of the present technology.

FIG. 4 illustrates an exemplary network device 400 for implementing the present disclosure. The network device 400 can be, for example, a spine node 102 or a leaf node 104. Network device 400 includes a master central processing unit (CPU) 402, interfaces 404, and a bus 406 (e.g., a PCI bus). When acting under the control of appropriate software or firmware, CPU 402 is responsible for detecting the failure of a spine node 102 in the network, generating and flooding LSPs to the remaining spine nodes 102 in the network, receiving from each surviving spine node 102 copies of the LSPs sent to each surviving spine node 102 by other leaf nodes 104 in the network, delaying flooding of the copies of the LSPs to the surviving spine nodes 102 by a designated amount of time, and synchronizing with each of the surviving spine nodes 102 to assure the surviving spine nodes have copies of the most current LSPs.

CPU 402 preferably accomplishes all these functions under the control of software including an operating system and any appropriate applications software. CPU 402 may include one or more processors 408 such as a processor from the Motorola family of microprocessors or the MIPS family of microprocessors. In an alternative embodiment, processor 408 is specially designed hardware for controlling the operations of network device 400. In a specific embodiment, a memory 410 (such as non-volatile RAM and/or ROM) also forms part of CPU 402. However, there are many different ways in which memory could be coupled to the system.

Interfaces 404 are typically provided as interface cards (sometimes referred to as "line cards"). Generally, they control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 402 to efficiently perform routing computations, network diagnostics, security functions, etc.

Although the system shown in FIG. 4 is one specific network device of the present technology, it is by no means the only network device architecture on which the present technology can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 410) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

I claim:

1. A method comprising:
receiving, at a first spine node in a network, a link state packet (LSP), the network comprising a plurality of leaf nodes in communication with a plurality of spine nodes, the LSP generated by one of the plurality of leaf nodes, the LSP being generated in response to detection of a network topology change in the network;
generating a copy of the LSP; and
forwarding the copy of the LSP to a leaf node selected from among the plurality of leaf nodes at a first rate that is faster than a second rate that the plurality of leaf nodes re-route copies of the LSP to each of the plurality of spine nodes, wherein the leaf node is configured to delay retransmission of the copy of the LSP causing the second rate to be a delayed rate, the delayed rate being slower than at least one of a default rate or a real time rate;
wherein the leaf node is further configured to determine if the leaf node did not receive the LSP from a second spine node during the delay.

2. The method of claim 1, wherein forwarding the copies of the LSP to the leaf node comprises hardware flooding the copies of the LSP to the leaf node.

3. The method of claim 2, further comprising:
determining an existence of one or more redundant links in the network; and
suppressing the hardware flooding of the copies of the LSP on the one or more redundant links.

4. The method of claim 1, further comprising maintaining, by the first spine node, an LSP database containing copies of the current LSPs.

5. The method of claim 4, further comprising synchronizing the LSP database of the first spine node with LSP databases of each of the plurality of leaf nodes.

6. The method of claim 5, wherein synchronizing the LSP database of the first spine node with the LSP databases of each of the plurality of leaf nodes comprises:
initiating an expedited complete sequence number packet (CSNP) timer;
at an expiration of the expedited CSNP timer, hardware flooding one or more CSNPs to at least one of the plurality of leaf nodes;
receiving one or more CSNPs generated by the at least one of the plurality of leaf nodes; and
updating the LSP database at the first spine node based on at least the CSNPs received from the at least one of the plurality of leaf nodes such that the LSP database contains the current LSPs.

7. The method of claim 6, wherein the hardware flooding of the one or more CSNPs to the at least one of the plurality of leaf nodes occurs at a first rate and the generation of the one or more CSNPs by the at least one of the plurality of leaf nodes occurs at a second rate, the first rate being faster than the second rate.

8. The method of claim 6, wherein updating the LSP database at the first spine node based on at least the CSNPs received from the at least one of the plurality of leaf nodes comprises forwarding a partial sequence number packet (PSNP) to one of the at least one of the plurality of leaf nodes in order to request a copy of the current LSPs.

9. A system comprising:
a processor; and
a non-transitory computer-readable storage medium having stored therein instructions which, when executed by the processor, cause the processor to perform operations comprising:
receiving one or more link state packets (LSPs), the LSPs generated by one or more of the plurality of leaf nodes, the LSPs being generated in response to detection of a network topology change in the network, the network comprising a plurality of leaf nodes in communication with a plurality of spine nodes;

generating copies of the LSPs; and forwarding the copies of the LSPs to a leaf node selected from among the plurality of leaf nodes at a first rate that is faster than a second rate that the leaf node re-routes copies of the LSP to each of the plurality of spine nodes, wherein the leaf node is configured to delay retransmission of the copy of the LSP causing the second rate to be a delayed rate, the delayed rate being slower than at least one of a default rate or a real time rate;

wherein the leaf node is further configured to determine if the leaf node did not receive the LSP from a second spine node during the delay.

10. The system of claim 9, wherein forwarding the copies of the LSPs to the leaf node comprises hardware flooding the copies of the LSPs to each of the plurality of leaf nodes.

11. The system of claim 9, the computer-readable storage medium storing additional instructions which, when executed by the processor, result in operations further comprising:

synchronizing an LSP database of a first spine node of the plurality of spine nodes with LSP databases of each of the plurality of leaf nodes.

12. The system of claim 11, wherein synchronizing the LSP database of the first spine node with the LSP databases of each of the plurality of leaf nodes comprises:

initiating an expedited complete sequence number packet (CSNP) timer;

at an expiration of the expedited CSNP timer, hardware flooding one or more CSNPs to the plurality of leaf nodes;

receiving one or more CSNPs generated by each of the plurality of leaf nodes; and updating the LSP database at the first spine node based on at least the CSNPs received from each of the plurality of leaf nodes such that the LSP database contains the current LSPs.

13. The system of claim 12, wherein the hardware flooding of the one or more CSNPs to the plurality of leaf nodes occurs at a first rate and the CSNPs generated by each of the plurality of leaf nodes occurs at a second rate, the first rate being faster than the second rate.

* * * * *